United States Patent [19]
Brown et al.

[11] Patent Number: 5,835,687
[45] Date of Patent: Nov. 10, 1998

[54] METHODS AND APPARATUS FOR PROVIDING DIGITAL HALFTONE IMAGES WITH RANDOM ERROR DIFFUSION DITHERING

[75] Inventors: Joseph Brown, Herndon; Brian Loch, Sterling, both of Va.

[73] Assignee: Vidar Systems Corporation, Herndon, Va.

[21] Appl. No.: 734,080

[22] Filed: Oct. 21, 1996

[51] Int. Cl.$^6$ .................................................. G06F 15/00
[52] U.S. Cl. ........................ 395/109; 358/447; 358/455; 358/458
[58] Field of Search ................................ 395/109, 101; 382/252, 274, 275, 232, 251, 169; 358/456, 457, 458, 534, 298, 455, 459, 463, 447, 535, 536

[56] References Cited

U.S. PATENT DOCUMENTS

| | | | |
|---|---|---|---|
| 4,920,501 | 4/1990 | Sullivan et al. | 358/458 |
| 5,051,841 | 9/1991 | Bowers et al. | 358/447 |
| 5,051,844 | 9/1991 | Sullivan | 358/458 |
| 5,130,823 | 7/1992 | Bowers | 358/466 |
| 5,172,247 | 12/1992 | Ghaderi | 358/456 |
| 5,208,871 | 5/1993 | Eschbach | 358/456 |
| 5,226,096 | 7/1993 | Fan | 358/459 |
| 5,243,443 | 9/1993 | Eschbach | 358/456 |
| 5,268,774 | 12/1993 | Eschbach | 358/466 |
| 5,325,211 | 6/1994 | Eschbach | 358/466 |
| 5,374,997 | 12/1994 | Eschbach | 358/447 |
| 5,467,201 | 11/1995 | Fan | 358/447 |
| 5,493,416 | 2/1996 | Fan | 358/447 |
| 5,519,791 | 5/1996 | Webb et al. | 382/252 |
| 5,521,989 | 5/1996 | Fan | 382/252 |
| 5,553,166 | 9/1996 | Kakutani | 382/252 |
| 5,642,204 | 6/1997 | Wang | 358/455 |

OTHER PUBLICATIONS

Ulichney, Robert, "The Error Diffusion Algorithm," Digital Halftoning, Chapter 8, pp. 239–309.

*Primary Examiner*—Kim Yen Vu
*Assistant Examiner*—Dov Popovici
*Attorney, Agent, or Firm*—Finnegan, Henderson, Farabow, Garrett & Dunner, L.L.P.

[57] ABSTRACT

A process for performing error diffusion to print an image with reduced visually apparent artifacts. The process involves a step of encoding selected pixels as binary values, and calculating error values corresponding to differences between modified intensity values of the pixels and predetermined threshold values. The calculated error values are diffused among four neighbors of each pixel in accordance with a predetermined ordered set of weighting factors. The set of weighting values dictates that 4/8 of the error is diffused to one of the pixel neighbors, 1/8 of the error is diffused to a second pixel neighbor, 2/8 of the error is diffused to a third pixel neighbor, and 1/8 of the error is diffused to a fourth pixel neighbor. A random selection is made of one of the predetermined set of weight values as a starting weight value. The starting weight value is assigned to a predetermined one of the pixel neighbors. Based on the starting weight value, the process then involves selecting in an ordered fashion weight values of the predetermined set of weight values until all the predetermined weight values have been selected, and assigning each selected weight value to a predetermined one of the pixel neighbors. This process continues for all pixels of an input image.

22 Claims, 6 Drawing Sheets

FIG. 1
(PRIOR ART)

|  | P(i,j) | 7 |
|---|---|---|
| 3 | 5 | 1 |

FIG. 5(a)

|  | X |  | 4 |
|---|---|---|---|
| 1 | 2 | 1 |  |

FIG. 5(b)

|  | X |  | 1 |
|---|---|---|---|
| 2 | 1 | 4 |  |

FIG. 5(c)

|  | X |  | 2 |
|---|---|---|---|
| 1 | 4 | 1 |  |

FIG. 5(d)

|  | X |  | 1 |
|---|---|---|---|
| 4 | 1 | 2 |  |

METHODS AND APPARATUS FOR PROVIDING DIGITAL HALFTONE IMAGES WITH RANDOM ERROR DIFFUSION DITHERING

I. BACKGROUND OF THE INVENTION

A. Field of the Invention

The present invention relates generally to a process for reproducing images by digital halftoning and, in particular, to a process for reproducing scanned images based on digital halftoning with error diffusion dithering.

B. Description of the Prior Art

Digital halftone printing has in large measure replaced conventional halftone printing techniques because of its significantly lower cost. Conventional halftone printing required special reproduction equipment, whereas digital halftone printing requires only a digital computer, an optical scanner, and a printer. Digital halftone printing involves a process of converting an image comprising a large number of gray levels to a reduced number of gray levels to render the image for display or output (hardcopy). The image, whether in color or black and white, is first scanned by an optical scanner in a gray level format containing a large number of gray density levels, for example, 256 levels for black and white images and more than 16 million levels ($256^3$) levels for color images, which is usually not reproducible on standard digital printing and display systems. Thus, images must be converted from the large number of gray scale levels to a fewer number of gray level values (for example, binary) in order that the image may be rendered on displays and printing systems.

Matrix dithering is one technique used to convert the large number of gray scale levels of an original image to a fewer number of gray level values in a reproduction of the original image. This technique involves comparing the gray scale values of pixels of the original scanned image with sets of predetermined thresholds and, depending upon whether the gray scale values of pixels of the original scanned image exceed the thresholds, the pixels are assigned new gray scale values for display or output of the image. For example, in the binary case, the pixels of the original image whose values exceed a threshold will be assigned black, while others will be assigned white, leaving it to the viewer to integrate the output image to distinguish areas of black, white, and varying shades of gray.

Using dithering techniques to reproduce images, however, results in a loss of image information. Specifically, the amount of gray within the original image is not maintained exactly over an area of the image because the finite number of elements inside each set of threshold values being compared against the values of the pixels of the original image. The error arising from the difference between the actual gray scale value of a pixel and the threshold value is discarded, which results in a loss of image information. As a result of ignoring this error, conventional dithering techniques create significant image artifacts, such as bands or patterns in the output image.

Other techniques attempt to convert gray image to binary or lesser level gray while attempting to preserve gray density of the images. One such technique, called error diffusion, attempts to maintain gray density by making the conversion from gray pixels to binary or other lower level pixels on a pixel-by-pixel basis. This procedure involves comparing each pixel with a threshold value, and forwarding the difference to neighboring pixels in a selected group, in accordance with a weighting scheme. In this manner all errors can be distributed and accounted for in the conversion process. It is therefore critical that an appropriate weighting scheme be selected that can both accommodate complex image information and process the image information in real-time, as required by today's image processing applications.

Figure 1:
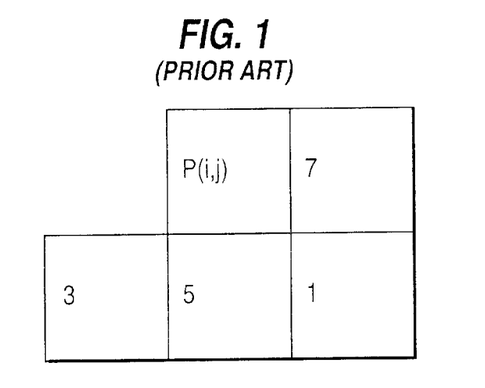
FIG. 1 is a weight matrix used to explain the conventional error diffusion technique proposed by Floyd and Steinberg.

The basic error diffusion technique was proposed by Floyd and Steinberg in 1975. According to this technique, the current input pixel is modified by adding an error generated from thresholding previous pixels. The threshold is typically fixed at half scale and is applied to the modified input pixel. The thresholding process generates an output that is full scale or zero scale and the difference between the modified input pixel and the threshold output is considered to be an error. This error is split up and applied to surrounding pixels that have not yet been subject to the process. The standard Floyd/Steinberg technique applies 7/16 of the error to the next pixel to be processed on the current scan line. The rest of the error (9/16) is applied in a fixed manner to three adjacent pixels on the next succeeding scan line. This is illustrated in FIG. 1 in which $P(i,j)$ represents the current pixel by Cartesian coordinates (i,j) within the image, and the numbers indicate how much of the error will be applied to each pixel (normalized to 16) with $P(i+1,j)=7$;

$P(i-1,j+1)=3$;

$P(i,j+1)=5$; and $P(i+1,j+1)=1$.

Thus, the gray scale value of pixel $P(i+1, j)$ will be modified to include 7/16 of the difference between a predetermined threshold value and the gray scale value of pixel $P(i,j)$, the current pixel. Similarly, pixels $P(i-1,j+1)$, $P(i,j+1)$, and $P(i+1,j+1)$ will be modified to include 3/16, 5/16, and 1/16 of the difference between a predetermined threshold value and the gray scale value of pixel $P(i,j)$, the current pixel.

Figure 2:
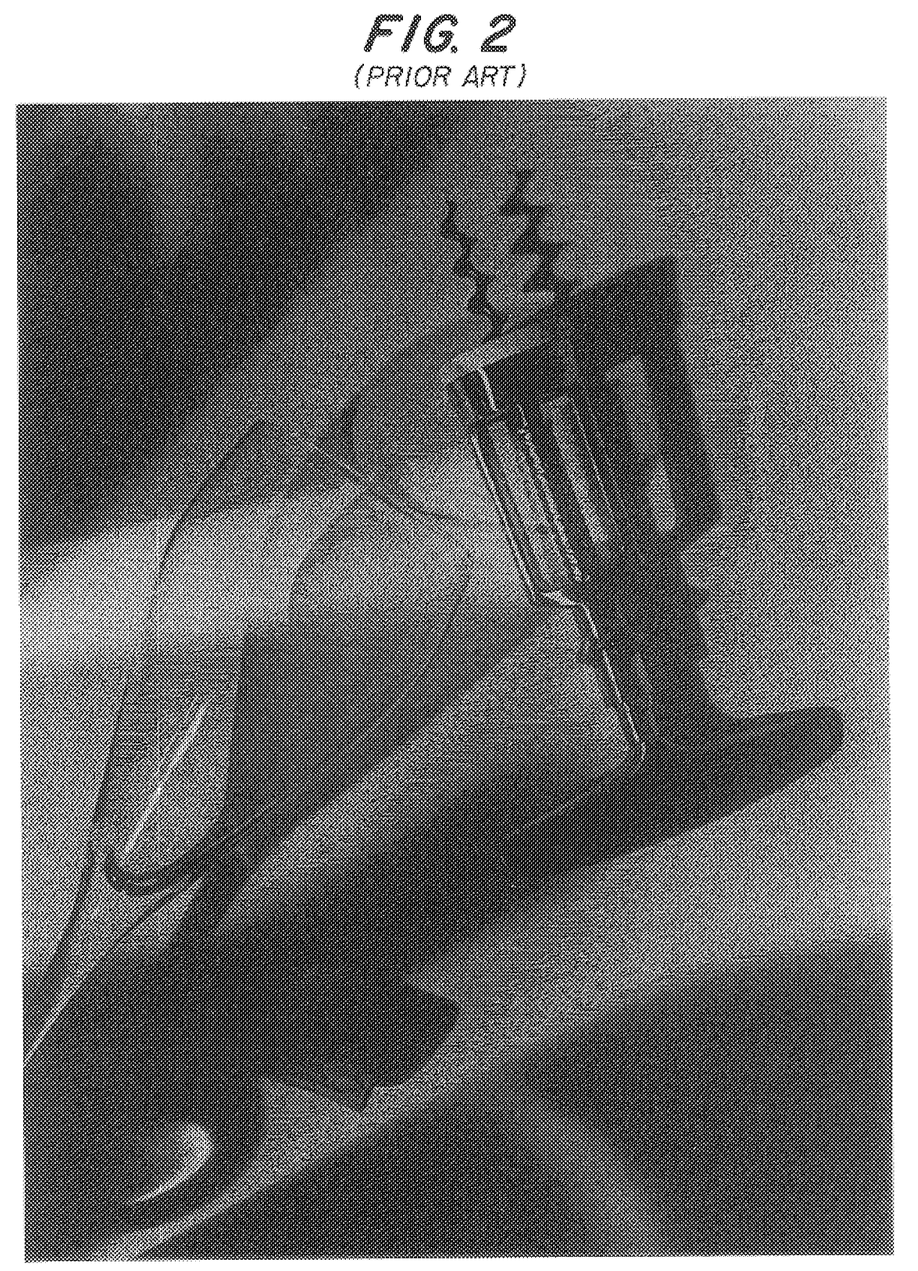
FIG. 2 is an image produced using the conventional error diffusion technique proposed by Floyd and Steinberg.

Digital halftone printing systems employing the standard Floyd/Steinberg approach to error diffusion produce images without the fixed pattern of the threshold matrix; however, they suffer from several deficiencies. At certain gray scale ranges, specifically, at midrange, the random pattern of pixels changes to a very noticeable grid pattern. Depending on the characteristics of the output device being used (for example, display device or printer), this can result in severe artifacts. In addition to this problem, in the light portions of an image, the dark pixels are generated in sinuous chains. This artifact, which is produced in the inverse in the darker portions of the image, is often referred to as "worming." These artifacts are illustrated in the image in FIG. 2. In addition to these image quality problems, systems employing the Floyd/Steinberg approach also suffer from a relatively high level of complexity that causes significant delays during image processing.

Attempts have been made to overcome the image quality problems of the basic Floyd/Steinberg approach. However, these approaches usually involve the addition of some sort of noise to the process. This noise can be added to the thresholding process or to the diffusion of the error to adjacent pixels. Other approaches have been based on randomizing the weights used while maintaining the average weights of the Floyd/Steinberg method. These methods, however, are not satisfactory because they add layers of complexity on top of the already complex Floyd/Steinberg method.

For example, U.S. Pat. No. 5,051,841 proposes a process that randomly selects a pixel from a neighboring set surrounding the pixel that is the subject of the operation, and then applies a random weight ($W_0$) to determine the amount of error to be allocated to that pixel. The value $W_0$ is selected to be in the range from 0.0 to 1.0. A second pixel in the remainder of the neighboring set is then randomly selected and another weight ($W_1$) is generated in the range of 0.0 to (1.0–$W_0$). This process is repeated for the third and fourth pixels in the neighboring set and the weights are selected from the remainder of the range, $W_2$ is in the range 0.0 to (1.0–$W_0$–$W_1$) and $W_3$ is (1.0–$W_0$–$W_1$–$W_2$). However, like the other conventional approaches, the method proposed by U.S. Pat. No. 5,051,841 adds layers of complexity to the already complex Floyd/Steinberg approach. It is difficult to implement in the time permitted for high-speed, real-time image processing. Thus, to implement this method would be extremely expensive in terms of hardware and/or software as well as processing time.

There is, therefore, a need for a process for reproducing or printing scanned images based on digital halftoning with error diffusion dithering that substantially obviates one or more of the problems due to the limitations and disadvantages of the related art.

II. Summary of the Invention

In accordance with the present invention, error diffusion dithering can be accomplished effectively and inexpensively by distributing a calculated error for image pixels having intensity values between predetermined threshold values to nearby pixels. The error is divided into eight parts that are distributed to four pixel neighbors of the $i^{th}$ pixel. Specifically, 4/8 of the error is diffused to one of the pixel neighbors, 1/8 of the error is diffused to a second pixel neighbor, 2/8 of the error is diffused to a third pixel neighbor, and 1/8 of the error is diffused to a fourth pixel neighbor. The process according to the present invention involves four steps. First, a random selection is made of one of the predetermined set of weight values (4/8, 1/8, 2/8, 1/8) as a starting weight value. The starting weight value is assigned to a predetermined one of the pixel neighbors. Based on the starting weight value, the process then involves selecting in an ordered fashion weight values of the predetermined set of weight values until all the predetermined weight values have been selected, and assigning each selected weight value to a predetermined one of the pixel neighbors. This process continues for all pixels of an input image.

In accordance with the present invention, as embodied and broadly described herein, a method for performing error diffusion to print an image with reduced visually apparent artifacts, performed by a scanner used to scan the image and detect sensitivity values at selected pixel locations, comprises the steps of encoding selected pixels as binary values, and calculating error values corresponding to differences between the intensity values of the pixels and predetermined threshold values. For selected pixel neighbors of an $i^{th}$ pixel location in the scanned image, the process diffuses the calculated error, $E_i$, of the $i^{th}$ pixel location to its selected neighbors according to the following formula: $e_j = w_j * E_i$.

Where $e_j$ is the error value diffused to the $j^{th}$ pixel neighbor from the $i^{th}$ pixel, where the $j^{th}$ pixel neighbor is a second-adjacent pixel location to the right of the $i^{th}$ pixel location and on the same scan line as the $i^{th}$ pixel, and where $w_j$ is a weighting factor randomly selected for the $j^{th}$ pixel location from a predetermined ordered set of weighting factors. This process is continued for other pixel neighbors of the $i^{th}$ pixel, where the other pixel neighbors are located on a scan line following the scan line of the $i^{th}$ pixel and are adjacent or diagonally-adjacent to the $i^{th}$ or $j^{th}$ pixel location, and where the weighting factors applied to the other pixel neighbors are selected from the ordered set of weighting factors in accordance with the weighting factor selected for the $j^{th}$ pixel.

It is to be understood that both the foregoing general description and the following detailed description are exemplary and explanatory and are intended to provide further explanation of the invention as claimed.

III. BRIEF DESCRIPTION OF THE DRAWINGS

The accompanying drawings which are incorporated in and which constitute part of this specification, illustrate a presently preferred implementation of the invention and, together with the description, serve to explain the principles of the invention.

In the drawings.

IV. DETAILED DESCRIPTION

Figure 3:
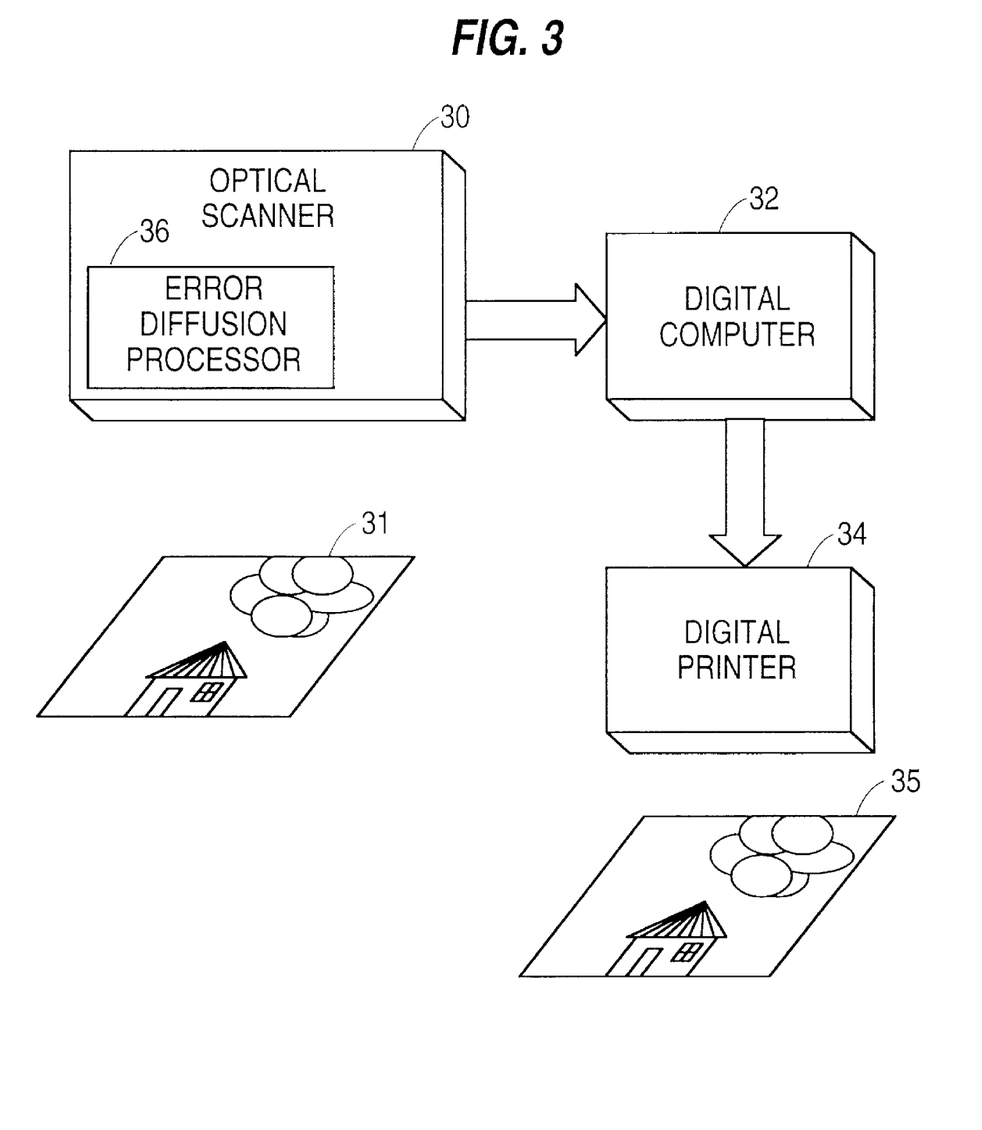
FIG. 3 is a functional block diagram of a digital halftoning system which operates according to the process of the present invention.

FIG. 3 generally shows a system for digital halftone printing. The components of the system comprise an optical image scanner 30, a general purpose digital computer 32, and a digital printer 34. The illustrated components 30, 32, and 34, may be conventional, but error diffusion processor 36 is not. The processor 36 operates to eliminate the appearance of artifacts in images printed by digital halftoning with error diffusion dithering.

The processor 36 is a combination of hardware and software and includes hardware capable of performing error diffusion dithering in accordance with the description below. The processor 36 uses a pseudo-random generator to determine which of the orders (see FIG. 5) of weight values is to be applied (discussed below). This would suggest to one skilled in the art that there will be repeats in the sequence. In order to minimize artifacts, however, it is important that repeated sequences not line up near one another on successive lines of an image. This can be ensured by using a long register, preferably a 20 bit shift register, with feedback, resulting in a repeat cycle of greater than one million pixels. The use of conventional shift registers for a pseudo-random sequence generator creates sequences with strings of identical two bit values. This can be avoided, however, by using inverters in between the shift register pairs. Other random generators may be used, provided that they generate a sequence of two bit weight selection values that does not repeat for around a million cycles or at least four rows of pixels on an average large format document.

In normal operation of the system of FIG. 3, scanner 30 digitizes an image from a medium 31, such as a photographic transparency, a photographic print, or a high-resolution printed original, so that the picture elements (i.e., pixels) of the original image are digitized to gray-scale values. Those skilled in the art will recognize that to process color images the scanner 30 will also make color separations of the image. Then the digitized values may be provided to digital computer 32 or directly to printer 34. Within computer 32, the digital information can be processed with conventional graphics software so that images can be retouched, adjusted, recomposed, and so forth. Then the processed images may be provided to digital printer 34 for printing onto a sheet 35 by the techniques of conventional digital halftone printing.

When the system of FIG. 3 is operated in accordance with the present invention, the digital image information that is provided to processor 36 is also binary encoded and then is operated upon according to the halftoning process of the present invention, to provide error diffusion prior to printing. Error diffusion processor 36 creates reproducible images that provide the illusion of a continuous-tone image without discernible artifacts.

Figure 4:
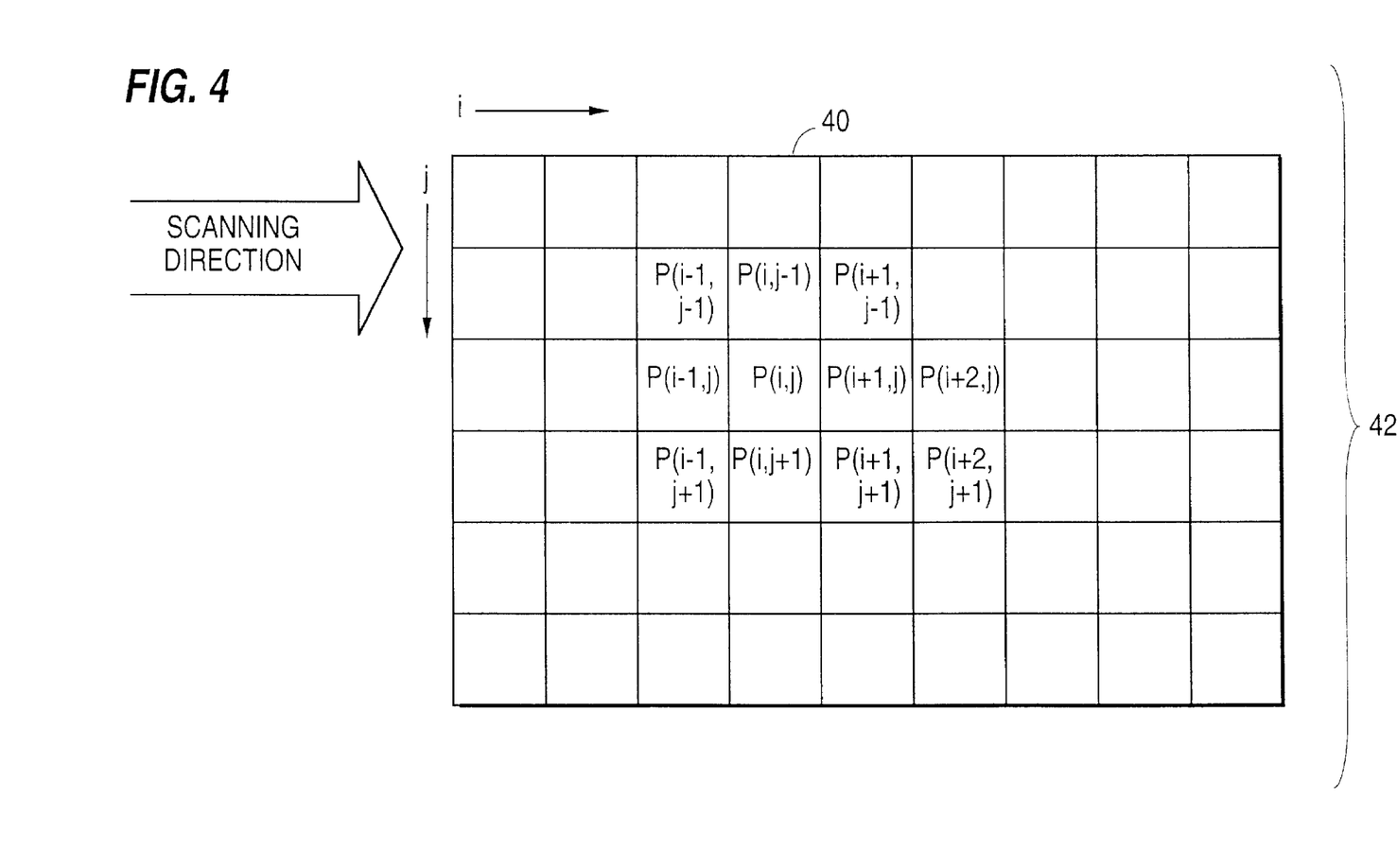
FIG. 4 schematically shows a field of pixels of an image and is used as an aid to the description of the error diffusion process of the present invention.
Figure 5A:
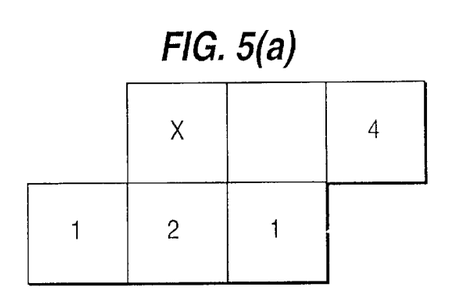
FIG. 5 illustrates four weight matrices (a)–(d) used to explain the four weight orders of the error diffusion process of the present invention.
Figure 5B:
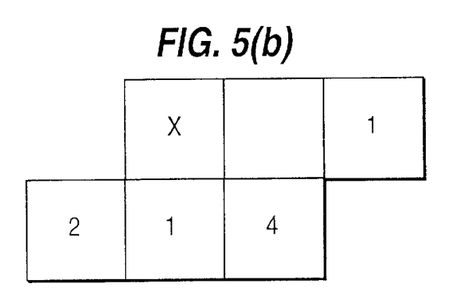
Figure 5C:
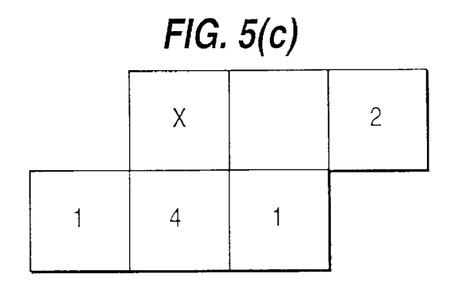
Figure 5D:
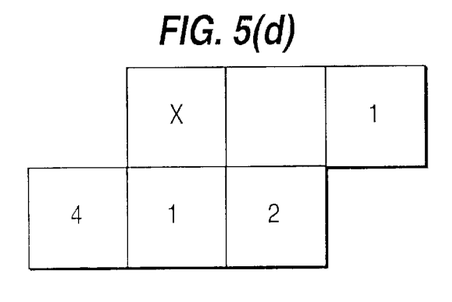

An error diffusion process according to the present invention will now be described with reference to FIGS. 4–7. In FIG. 4, each box 40 in the field 42 should be understood to represent one pixel location on an image which is presented for optical scanning. For purposes of this explanation, it can be assumed that scanning proceeds from left to right across each pixel row and sequentially, row by row, from the top to the bottom of the field. Such a scanning pattern can be described as a raster-type scanning pattern. Other scanning patterns, however, might be used; for example, scanning can proceed from left to right across one row of pixels, then in the opposite direction across the next lower row, and so forth in a serpentine pattern.

The location of each pixel 40 in the field 42 in FIG. 4 can be described by Cartesian coordinates; accordingly, an arbitrary pixel "P" is designated as having location (i,j). Because pixel P(i,j) is in the interior of the field, it has eight immediately-adjacent pixel neighbors, namely, P(i−1,j−1), P(i,j−1), P(i+1,j−1), P(i−1,j), P(i+1,j), P(i−1,j+1), P(i,j+1), and P(i+1,j+1). According to the present invention, the error for a current pixel (p(i,j) is diffused among pixels P(i+2,j), P(i−1,j+1), P(i,j+1), and P(i+1,j+1). Delaying application of the diffusion process by one pixel (i.e., not diffusing the error to P(i+1,j)) so the error for P(i,j) is diffused to pixels P(i+2,j), P(i−1,j+1), P(i,j+1), and P(i+1,j+1) permits slower logic functions and, thus, a lower cost implementation of error diffusion dithering than the approaches proposed by conventional systems.

The error diffusion process of the present invention will be described as beginning at pixel P(i,j) in FIG. 4. Further for purposes of this explanation, the magnitude of the detected gray-scale value of pixel P(i,j) will be described as an arbitrary number "z" which is between 0 and 255, inclusive. The coding error for any pixel location in the field will be referred to as e(i,j) where the subscripts identify the Cartesian coordinates of the pixel.

When a pixel at a given location (i,j) has a value z that lies between a threshold value T and the maximum gray-scale value (e.g., 255), the magnitude of the encoding error e(i,j) will be a negative number equal to z minus 255 gray-scale units; that is, $$e(i,j) = z - 255 \text{ for } z \geq T.$$

When the pixel value z is a number between 0 and the threshold value, the magnitude of the encoding error is simply equal to the value z in gray-scale units; that is, $$e(i,j) = z \text{ for } z \leq T.$$

The selected threshold value T is usually a number about midway along the selected gray-scale and typically equals 128. Although the threshold value usually is held constant, it could be randomly varied, or dithered, in a relatively narrow range about a chosen central value (e.g., 128).

In the preferred embodiment of an error diffusion process according to the present invention, coding errors are pseudo-randomly diffused from each given pixel P(i,j) to the four nearby pixels P(i+2,j), P(i−1,j+1), P(i,j+1), and P(i+1,j+1), which are scanned after the given pixel location P(i,j).

In the preferred embodiment of an error diffusion process according to the present invention, pixel P(i+2,j) is assigned a weighting factor $W_1$, where the value of the weighting factor $W_1$ is randomly chosen from an order set of weight values 4,1,2,1. The weights (4,1,2,1) were chosen to allow use of shifts for simplified calculations and related hardware required to do the calculations. Next, once a weight value $W_1$ has been assigned to pixel P(i+2,j), the remaining pixels P(i−1,j+1), P(i,j+1), and P(i+1,j+1) are assigned weight values $W_2$, $W_3$, and $W_4$ in accordance with the next weight value in the ordered set.

FIG. 5 illustrates the four possible combinations or matrices (a) to (d) for weight values $W_1$, $W_2$, $W_3$, and $W_4$, with the notation x corresponding to the location of pixel P(i,j). Thus, in matrix (a) pixels P(i+2,j), P(i−1,j+1), P(i,j+1), and P(i+1,j+1) are assigned weight values 4,1,2,1, respectively. Similarly, in matrix (b) the same pixels are assigned weight values 1,2,1,4; in matrix (c) they are assigned weight values 2, 1, 4, 1; and in matrix (d) they are assigned weight values 1, 4, 1, 2. Thus, using matrix (a), 4/8 of the error e(i,j) for pixel P(i,j) is diffused to pixel P(i+2,j), 1/8 of the error e(i,j) is diffused to P(i−1,j+1), 2/8 of the error e(i,j) is diffused to P(i,j+1), and 1/8 of the error e(i,j) is diffused to P(i+1,j+1).

As also illustrated in FIG. 5, instead of randomizing the weight values, as suggested by the Floyd/Steinberg approach as well as by U.S. Pat. No. 5,051,841, the present invention follows a pseudo-random approach in which only the weight value $W_1$ for the portion of the error e(i,j) to be diffused to pixel P(i+2,j) is randomly selected from an ordered set. Thus, once $W_1$ has been selected, the weight values for $W_2$, $W_3$, and $W_4$ are selected based on the next succeeding weight value in the ordered set 4,1,2,1. In other words, the four weights 4,1,2,1 can be thought of as being four points on a circle. The approach taken by the present invention is to randomize the starting point according to a pseudo-random sequence generator. The weight values are always applied in the same order, with only the starting point changing. This leaves the four arrangements of weight values shown in FIG. 5. At each pixel step, a new starting point is randomly chosen and applied to the error e(i,j) for that pixel P(i,j) to determine the amount of error e(i,j) to diffuse to neighbor pixels P(i+2,j), P(i−1,j+1), P(i,j+1), and P(i+1,j+1). Since the weight values of the ordered set (4,1,2,1) used in accordance with this invention are all powers of two, the application of the weight error only involves shifting the error value to the right. Furthermore, no selection or computation is required to assign weight values to pixels other than pixel P(i+2,j).

As mentioned above, pseudo-random weights assigned to pixels P(i+2,j), P(i−1,j+1), P(i,j+1), and P(i+1,j+1) are used to propagate, or spread, coding errors to the neighbors of each scanned pixel location. For convenience of expression, the propagated error values are designated herein as E1, E2, E3, and E4 to designate the error values which are distributed to pixel locations P(i+2,j), P(i−1,j+1), P(i,j+1), and P(i+1,j+1), respectively.

According to the foregoing, the error value $E_1$ which is to be propagated to the pixel located at P(i+2,j) from the pixel located at (i,j) is determined by multiplying the weight value assigned to pixel P(i+2j) by the encoding error for pixel P(i,j); that is, $E_1=(W_1(P(i+2,j)))(e(i,j))$. Likewise, the error E2 propagated to the pixel P(i−1,j+1) is $E_2=(W_2(P(i−1j+1)))(e(i,j))$, and the error E3 propagated to the pixel P(i,j+1) is $E_3=(W_3(P(i,j+1)))(e(i,j))$. Finally, the error E4 propagated from pixel P(i,j) to the pixel P(i+1,j+1) is $E_4=(W_4(P(i+1,j+1)))(e(i,j))$.

As a result of coding error being diff-used, gray-scale values of pixel located are increased, or decreased. For example, after error diffusion from pixel P(i,j), the gray-scale value inputed to the location (i+2,j) would be the detected gray-scale value for that location plus the propagated error E1. Likewise, the gray-scale value input to the pixel P(i+1,j+1) would be the detected gray-scale value for that pixel location plus the propagated error $E_2$. The effects of the error diffusion process on the pixel neighbors of pixel P in this example can be summarized as follows:

$$P'(i+2,j)=P(i+2,j)+E_1$$

$$P'(i-1,j+1)=P(i-1,j+1)+E_2$$

$$P'(i,j+1)=P(i,j+1)+E_3 \text{ and}$$

$$P'(i+1,j+1)=P(i+1,j+1)+E_4$$

where the primes (P') indicate that the gray-scale values of the pixel locations are updated as a result of the above-described error diffusion process.

Figure 6:
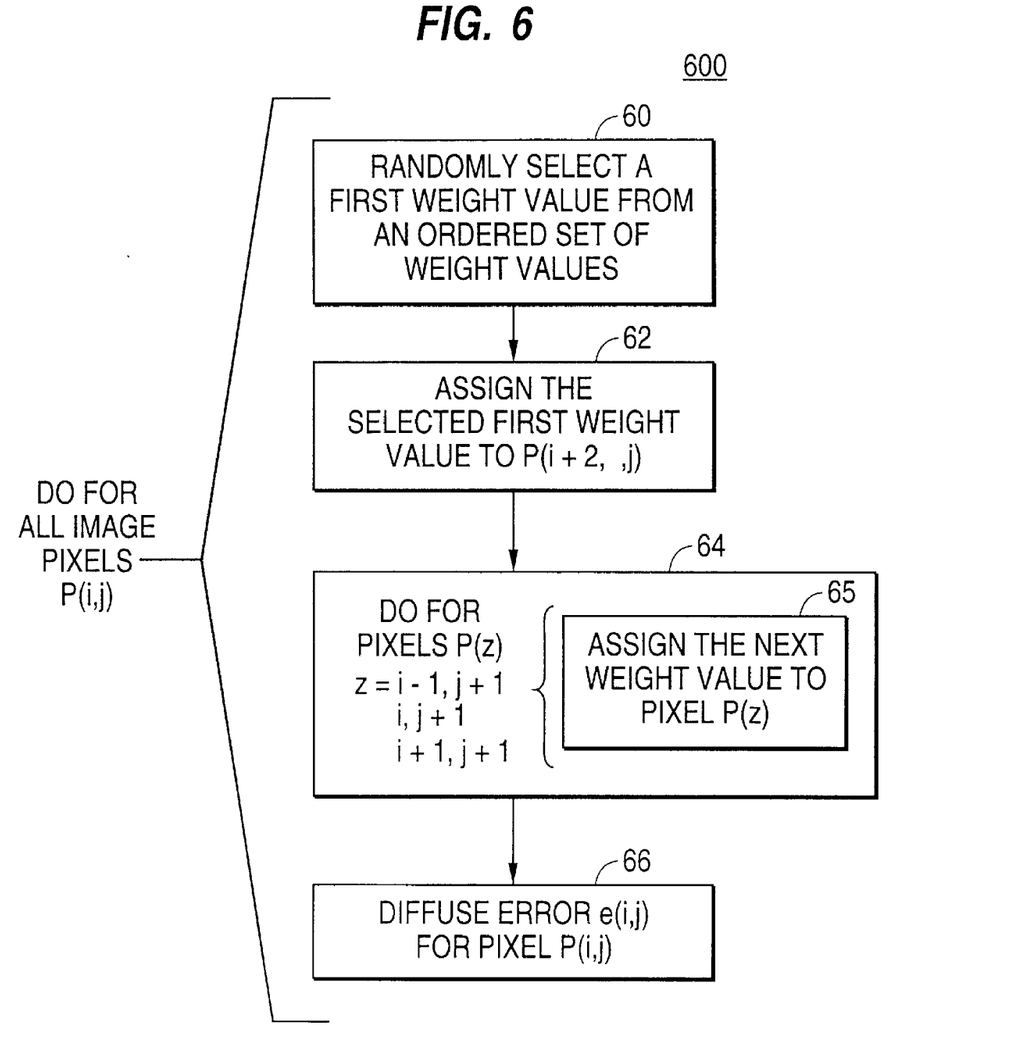
FIG. 6 is a flow diagram used to explain the error diffusion process of the present invention.

FIG. 6 is a flow chart of the steps used to perform error diffusion dithering according to the process of the present invention. For each pixel in an image, the error diffusion component 36 (see FIG. 3) randomly selects a first weight value from an order set of weight values, preferably the set 4, 1, 2, 1 (step 60). The processor 36 then assigns that randomly selected weight value $W_1$ to be used to diffuse the error e(i,j) of pixel P(i,j) to pixel P(i+2,j) (step 62). Then, for each pixel P(z), where z stands for the notations (i−1,j+1); (i,j+1); and (i+1,j+1), the processor 36 assigns the next weight value from the ordered set of weight values to pixel P(z) (step 65). After the weight values have been assigned to the neighboring pixels that will be used to diffuse the error e(i,j) of pixel P(i,j), the processor 36 diffuses the error e(i,j) among those neighboring pixels in accordance with the selected weight values (step 66). Thus, for example, using the weight values specified in matrix (a) of FIG. 5, 4/8 of the error e(i,j) for pixel P(i,j) is diffused to pixel P(i+2,j), 1/8 of the error e(i,j) is diffused to P(i−1,j+1), 2/8 of the error e(i,j) is diffused to P(i,j+1), and 1/8 of the error e(i,j) is diffused to P(i+1,j+1). Again, the process of steps 60–66 are repeated by the processor 36 for all pixels in the image.

Figure 7:
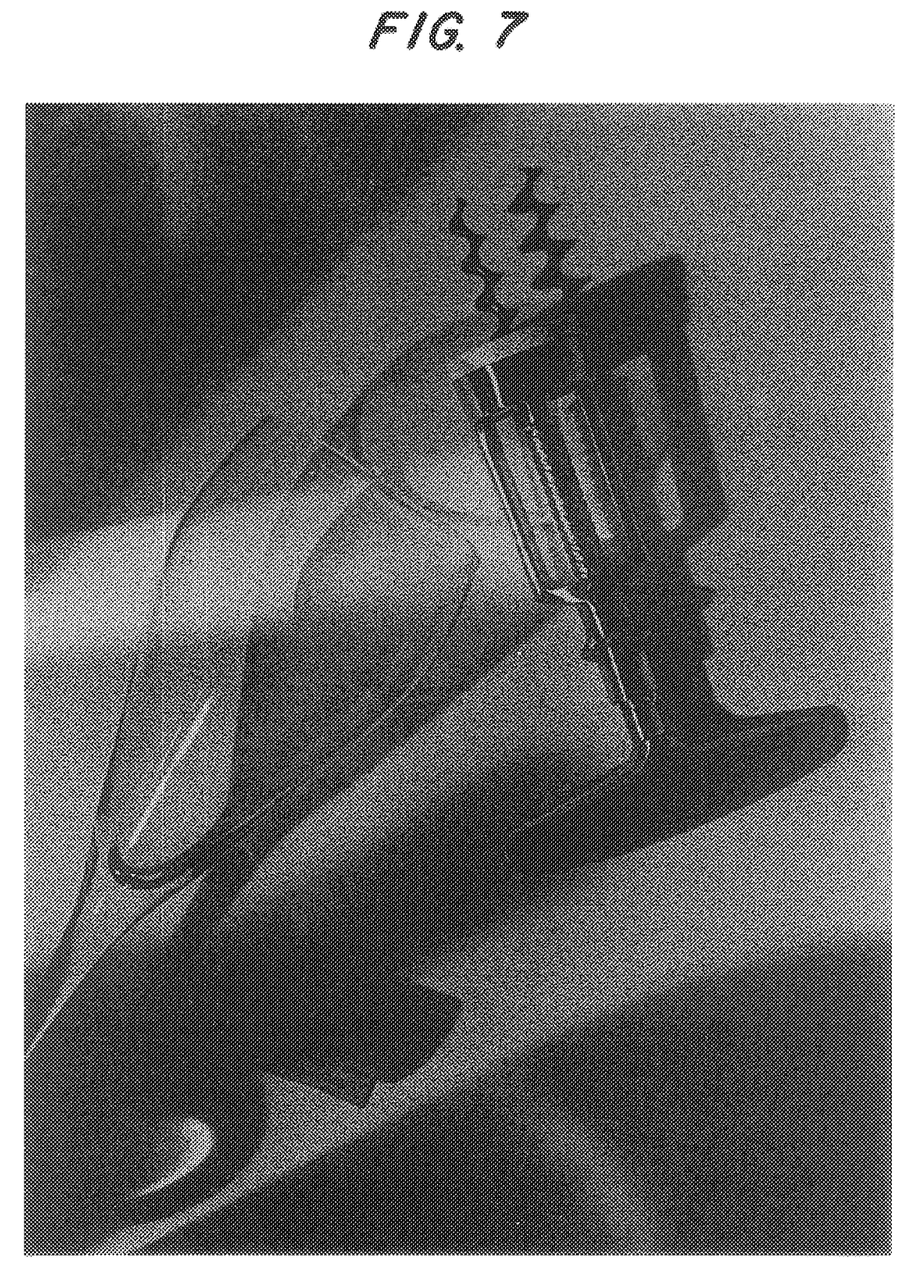
FIG. 7 is an image produced using the process of the present invention.

An example of an image produced using the process of the present invention is illustrated in FIG. 7. As can be by a comparison of the image in FIG. 2 with the image in FIG. 7, by employing the process of the present invention, processor 36 eliminates the artifacts found by employing the Floyd/Steinberg technique for error diffusion. It should be emphasized that the above-described error diffusion process continues for each successively scanned pixel location.

Other embodiments of the invention will be apparent to those skilled in the art from consideration of the specification and practice of the invention disclosed herein. For example, two threshold values, one for a black point in the gray scale and one for a white point in the gray scale such that if the unmodified pixel value (i.e., value before application of error diffusion) is between the two thresholds then the error diffusion procedure described above is applied. Otherwise, the value of the unmodified pixel is set to black if its value is below the black point threshold and to white if its value is above the white point threshold. Additionally, in accordance with the present invention, the error for pixel P(i,j) may be diffused to pixels P(i+2,j), P(i,j+1), P(i+1,j+1), and P(i+2, j+1). It is intended that the specification and examples be considered as exemplary only, with a true scope and spirit of the invention being indicated by the following claims.

What is claimed is:

1. A process for performing error diffusion to print an image with reduced visually apparent artifacts, wherein the process is performed by a processor connected to a scanner that scans the image and detect intensity values at selected pixel locations, the process comprising the steps of:

encoding selected ones of the pixel locations as binary values, and calculating error values corresponding to differences between modified intensity values for such pixel locations and predetermined threshold values;

for selected pixel neighbors of an $i^{th}$ pixel location in the scanned image, diffusing the calculated error value, $E_i$, of the $i^{th}$ pixel location to its selected neighbors as follows:

$$e_j = w_j * E_i$$

where $e_j$ is the error value diffused to the $j^{th}$ pixel neighbor from the $i^{th}$ pixel location, where the $j^{th}$ pixel neighbor is a second-adjacent pixel location to the right of the $i^{th}$ pixel location and on the same scan line as the $i^{th}$ pixel location, and where $w_j$ is a weighting factor randomly selected for the $j^{th}$ pixel location from a predetermined ordered set of weighting factors;

continuing the error diffusion process for other pixel neighbors of the $i^{th}$ pixel location, wherein the other pixel neighbors are located on a scan line following the scan line of the $i^{th}$ pixel location and are adjacent or diagonally-adjacent to the $i^{th}$ or $j^{th}$ pixel location, and wherein the weighting factors applied to the other pixel neighbors are selected from the ordered set of weighting factors in accordance with the weighting factor selected for the $j^{th}$ pixel location; and continuing the error diffusion process for the $(i+1)^{th}$ pixel location and so forth, such that coding errors are diffused from substantially all of the pixel locations in the image.

2. The process of claim 1 wherein an inverse value of each of the weighting factors in the ordered set of weighting factors is a power of two.

3. The process of claim 2 wherein the weighting factors include 1/2, 1/8, 1/4, 1/8.

4. A digital halftoning process with random error diffusion for reducing visually apparent artifacts in images that are produced by digital halftone printing, comprising the steps of:

scanning an image to detect intensity values at selected pixel locations;

encoding selected ones of the pixel locations as one binary value when the detected intensity value at a location is less than a predetermined threshold value, and calculating error values for such pixel locations that equal the detected intensity values;

encoding selected other ones of the pixel locations as a second binary value when the detected intensity values at those locations are greater than the predetermined threshold value, and calculating error values for those locations that equal the detected intensity values less the upper limit of an intensity scale;

for selected pixel neighbors of an $i^{th}$ pixel location in the scanned image, diffusing the calculated error value, $E_i$, of the $i^{th}$ pixel location to its selected neighbors as follows:

$$e_j = w_j^* E_i$$

where $e_j$ is the error value diffused to the $j^{th}$ pixel neighbor from the $i^{th}$ pixel location, where the $j^{th}$ pixel neighbor is a second-adjacent pixel location to the right of the $i^{th}$ pixel location and on the same scan line as the $i^{th}$ pixel location, and where $w_j$ is a weighting factor randomly selected for the $j^{th}$ pixel location from a predetermined ordered set of weighting factors;

continuing the error diffusion process for other pixel neighbors of the $i^{th}$ pixel location, wherein the other pixel neighbors are located on a scan line following the scan line of the $i^{th}$ pixel location and are adjacent or diagonally-adjacent to the $i^{th}$ or $j^{th}$ pixel location, and wherein the weighting factors applied to the other pixel neighbors are selected from the ordered set of weighting factors in accordance with the weighting factor selected for the $j^{th}$ pixel location;

continuing the error diffusion process for the $(i+1)^{th}$ pixel location and so forth, such that coding errors are diffused from substantially all of the pixel locations in the image; and     printing images by digital halftone printing based upon intensity values of pixel locations that have been modified by error diffusion.

5. The process of claim 4 wherein the predetermined threshold value is a number about midway along the intensity scale.

6. The process of claim 4 wherein the predetermined threshold value is a constant.

7. The process of claim 4 wherein an inverse value of each of the weighting factors in the ordered set of weighting factors is a power of two.

8. The process of claim 4 wherein the weighting factors include 1/2, 1/8, 1/4, 1/8.

9. A digital halftoning process with random error diffusion for reducing visually apparent artifacts in images that are produced by digital halftone printing, comprising the steps of:

scanning an image to detect intensity values at selected pixel locations;

encoding selected ones of the pixel locations as one binary value when the detected intensity value at a location is less than a predetermined threshold value, and calculating error values for such pixel locations that equal the detected intensity values;

encoding selected other ones of the pixel locations as a second binary value when the detected intensity values at those locations are greater than the predetermined threshold value, and calculating error values for those locations that equal the detected intensity values less the upper limit of an intensity scale;

for selected pixel neighbors of an $i^{th}$ pixel location in the scanned image, diffusing the calculated error value, $E_i$, of the $i^{th}$ pixel location to its selected neighbors as follows:

$$e(P(i+2,j)) = E_i^* W_1$$
$$e(P(i-1,j+1)) = E_i^* W_2$$
$$e(P(i,j+1)) = E_i^* W_3$$
$$e(P(i+1,j+1)) = E_i^* W_4$$

where i represents a row of the scanned image and j represents a column of the scanned image, where the selected neighbors include P(i+2,j), P(i−1,j+1), P(i,j+1), and P(i+1,j+1) so that e(P(i+2,j)) is an amount of the error value $E_i$ to be assigned to pixel neighbor P(i+2,j), e(P(i−1,j+1)) is an amount of the error value $E_i$ to be assigned to pixel neighbor P(i−1j+1), e(P(i,j+1)) is an amount of the error value $E_i$ to be assigned to pixel neighbor P(i,j+1), and e(P(i+1,j+1)) is an amount of the error value $E_i$ to be assigned to pixel neighbor P(i+1j+1), and where $W_1$, $W_2$, $W_3$, and $W_4$ are selected from an ordered set of weight values; and     continuing the error diffusion process for the $(i+1)^{th}$ pixel location and so forth, such that coding errors are diffused from substantially all of the pixel locations in the image.

10. The process of claim 9, wherein the ordered set of weight values is 4/8, 1/8, 2/8, 1/8.

11. A digital halftoning process with random error diffusion for reducing visually apparent artifacts in images that are produced by digital halftone printing, comprising the steps of:

scanning an image to detect intensity values at selected pixel locations; encoding selected ones of the pixel locations as one binary value when the detected intensity value at a location is less than a predetermined threshold value, and calculating error values for such pixel locations that equal the detected intensity values;

encoding selected other ones of the pixel locations as a second binary value when the detected intensity values at those locations are greater than the predetermined threshold value, and calculating error values for those locations that equal the detected intensity values less the upper limit of an intensity scale;

for selected pixel neighbors of an $i^{th}$ pixel location in the scanned image, diffusing the calculated error value, $E_i$, of the $i^{th}$ pixel location to its selected neighbors as follows:

$$e(P(i+2,j)) = E_i^* W_1$$
$$e(P(i-1,j+1)) = E_i^* W_2$$
$$e(P(i,j+1)) = E_i^* W_3$$
$$e(P(i+1,j+1)) = E_i^* W_4$$

where i represents a row of the scanned image and j represents a column of the scanned image, where the selected neighbors include P(i+2,j), P(i−1i+1), P(i,j+1), and P(i+1,j+1) so that e(P(i+2,j)) is an amount of the error value $E_i$ to be assigned to pixel neighbor P(i+2,j), e(P(i−1,i+1)) is an amount of the error value $E_i$ to be assigned to pixel neighbor P(i−1j+1), e(P(i,j+1)) is an amount of the error value $E_i$ to be assigned to pixel neighbor P(i,j+1), and e(P(i+1j+1)) is an amount of the error value $E_i$ to be assigned to pixel neighbor P(i+1j+1), and where $W_1$, $W_2$, $W_3$, and $W_4$ are selected from an ordered set of weight values; and     continuing the error diffusion process for the $(i+1)^{th}$ pixel location and so forth, such that coding errors are diffused from substantially all of the pixel locations in the image.

12. The process of claim 11, wherein the ordered set of weight values is 4/8, 1/8, 2/8, 1/8.

13. Apparatus for performing error diffusion to print an image with reduced visually apparent artifacts, wherein a scanner scans the image and detects intensity values at selected pixel locations, the apparatus comprising:

an encoder configured to encode selected ones of the pixel locations as binary values, and calculate error values corresponding to differences between modified intensity values for such pixel locations and predetermined threshold values;

a diffuser, coupled to said encoder, configured to diffuse the calculated error value, $E_i$, for selected pixel neighbors of an $i^{th}$ pixel location in the scanned image as follows:

$$e_j = w_j * E_i$$

where $e_j$ is the error value diffused to the $j^{th}$ pixel neighbor from the $i^{th}$ pixel location, where the $j^{th}$ pixel neighbor is a second-adjacent pixel location of the $i^{th}$ pixel location and on the same scan line as the $i^{th}$ pixel location, and where $w_j$ is a weighting factor randomly selected for the $j^{th}$ pixel location from a predetermined ordered set of weighting factors;

said diffuser continuing to diffuse the error $E_i$ to other pixel neighbors of the $i^{th}$ pixel location, wherein the other pixel neighbors are located on a scan line following the scan line of the $i^{th}$ pixel location and are adjacent or diagonally-adjacent to the $i^{th}$ or $j^{th}$ pixel location, and wherein the weighting factors applied to the other pixel neighbors are selected from the ordered set of weighting factors in accordance with the weighting factor selected for the $j^{th}$ pixel location.

14. The apparatus of claim 13 wherein an inverse value of each of the weighting factors in the ordered set of weighting factors is a power of two.

15. The apparatus of claim 13 wherein the weighting factors include 1/2, 1/8, 1/4, 1/8.

16. A system for reducing visually apparent artifacts in images that are produced by digital halftone printing, comprising:

a scanner configured to scan an image to detect intensity values at selected pixel locations;

an encoder, coupled to the scanner, configured to encode selected ones of the pixel locations as one binary value when the detected intensity value at a location is less than a predetermined threshold value, and to calculate error values for such pixel locations that equal the detected intensity values;

said encoder configured to encode selected other ones of the pixel locations as a second binary value when the detected intensity values at those locations are greater than the predetermined threshold value, and calculate error values for those locations that equal the detected intensity values less the upper limit of an intensity scale;

a diffuser, coupled to said encoder, configured to diffuse the calculated error value, $E_i$, of an $i^{th}$ pixel location to its selected neighbors as follows:

$$e_j = w_j * E_i$$

where $e_j$ is the error value diffused to the $j^{th}$ pixel neighbor from the $i^{th}$ pixel location, where the $j^{th}$ pixel neighbor is a second-adjacent pixel location to the right of the $i^{th}$ pixel location and on the same scan line as the $i^{th}$ pixel location, and where $w_j$ is a weighting factor randomly selected for the $j^{th}$ pixel location from a predetermined ordered set of weighting factors;

said diffuser continuing to diffuse the error $E_i$ to other pixel neighbors of the $i^{th}$ pixel location, wherein the other pixel neighbors are located on a scan line following the scan line of the $i^{th}$ pixel location and are adjacent or diagonally-adjacent to the $i^{th}$ or $j^{th}$ pixel location, and wherein the weighting factors applied to the other pixel neighbors are selected from the ordered set of weighting factors in accordance with the weighting factor selected for the $j^{th}$ pixel location; and a printer, coupled to said scanner, configured to print images by digital halftone printing based upon intensity values of pixel locations that have been modified by error diffusion.

17. The system of claim 16 wherein the predetermined threshold value is a number about midway along the intensity scale.

18. The system of claim 16 wherein the predetermined threshold value is a constant.

19. The system of claim 16 wherein an inverse value of each of the weighting factors in the ordered set of weighting factors is a power of two.

20. The system of claim 16 wherein the weighting factors include 1/2, 1/8, 1/4, 1/8.

21. A digital halftoning apparatus for reducing visually apparent artifacts in images that are produced by digital halftone printing, comprising:

a scanner configured to scan an image to detect intensity values at selected pixel locations;

an encoder configured to encode selected ones of the pixel locations as one binary value when the detected intensity value at a location is less than a predetermined threshold value, and to calculate error values for such pixel locations that equal the detected intensity values;

said encoder configured to encode selected other ones of the pixel locations as a second binary value when the detected intensity values at those locations are greater than the predetermined threshold value, and calculate error values for those locations that equal the detected intensity values less the upper limit of an intensity scale;

a diffuser configured to diffuse the calculated error value, $E_i$, of an $i^{th}$ pixel location to its selected neighbors as follows:

$$e(P(i+2,j)) = E_i * W_1$$
$$e(P(i-1,j+1)) = E_i * W_2$$
$$e(P(i,j+1)) = E_i * W_3$$
$$e(P(i+1,j+1)) = E_i * W_4$$

where i represents a row of the scanned image and j represents a column of the scanned image, where the selected neighbors include P(i+2,j), P(i−1,j+1), P(i,j+1), and P(i+1,j+1) so that e(P(i+2,j)) is an amount of the error value $E_i$ to be assigned to pixel neighbor P(i+2,j), e(P(i−1,j+1)) is an amount of the error value $E_i$ to be assigned to pixel neighbor P(i−1,j+1), e(P(i,j+1)) is an amount of the error value $E_i$ to be assigned to pixel neighbor P(i,j+1), and e(P(i+1,j+1)) is an amount of the error value $E_i$ to be assigned to pixel neighbor P(i+1j+1), and where $W_1$, $W_2$, $W_3$, and $W_4$ are selected from an ordered set of weight values; and said encoder and said diffuser configured to continue to diffuse an error for the $(i+1)^{th}$ pixel location and so forth, such that coding errors are diffused from substantially all of the pixel locations in the image.

22. A digital halftoning processor for reducing visually apparent artifacts in images that are produced by digital halftone printing, comprising:

a scanner configured to scan an image to detect intensity values at selected pixel locations;

an encoder configured to encode selected ones of the pixel locations as one binary value when the detected intensity value at a location is less than a predetermined threshold value, and calculate error values for such pixel locations that equal the detected intensity values;

said encoder configured to encode selected other ones of the pixel locations as a second binary value when the detected intensity values at those locations are greater than the predetermined threshold value, and calculate error values for those locations that equal the detected intensity values less the upper limit of an intensity scale;

a diffuser configured to diffuse the calculated error value, $E_i$, of an $i^{th}$ pixel location to its selected neighbors as follows:

$$e(P(i+2,j))=E_i*W_1$$

$$e(P(i-1,j+1))=E_i*W_2$$

$$e(P(i,j+1))=E_i*W_3$$

$$e(P(i+1,j+1))=E_i*W_4$$

where i represents a row of the scanned image and j represents a column of the scanned image, where the selected neighbors include P(i+2,j), P(i−1,i+1), P(i,j+1), and P(i+1j+1) so that e(P(i+2,j)) is an amount of the error value $E_i$ to be assigned to pixel neighbor P(i+2,j), e(P(i−1,j+1)) is an amount of the error value $E_i$ to be assigned to pixel neighbor P(i−1,i+1) e(P(i,j+1)) is an amount of the error value $E_i$ to be assigned to pixel neighbor P(i,j+1), and e(P(i+1,j+1)) is an amount of the error value $E_i$ to be assigned to pixel neighbor P(i+1,j+1), and where $W_1$, $W_2$, $W_3$, and $W_4$ are selected from an ordered set of weight values; and said encoder and said diffuser configured to continue to diffuse an error for the $(i+1)^{th}$ pixel location and so forth, such that coding errors are diffused from substantially all of the pixel locations in the image.

* * * * *

UNITED STATES PATENT AND TRADEMARK OFFICE
CERTIFICATE OF CORRECTION

PATENT NO. : 5,835,687
DATED : November 10, 1998
INVENTOR(S) : Jospeh Brown, et al It is certified that error appears in the above-identified patent and that said Letters Patent is hereby corrected as shown below:

Claim 9, col. 10, line 5, "P(i-1j+1)" should read --P(i-1,j+1)--.

Claim 9, col. 10, line 8, "P(i+1j+1)" should read --P(i+1,j+1)--.

Claim 11, col. 10, line 47, "P(i-1i+1)" should read --P(i-1,j+1)--.

Claim 11, col. 10, line 49, "e(P(i-1,i+1))" should read --e(P(i-1,j+1))--.

Claim 11, col. 10, line 51, "P(i-1j+1)" should read --P(i-1,j+1)--.

Claim 11, col. 10, line 53, "e(P(i+1j+1))" should read --e(P(i+1,j+1))--.

Claim 11, col. 10, line 54, "P(i+1j+1)" should read --P(i+1,j+1)--.

Claim 21, col. 12, line 58, "P(i+1j+1)" should read --P(i+1,j+1)--.

UNITED STATES PATENT AND TRADEMARK OFFICE
CERTIFICATE OF CORRECTION

PATENT NO. : 5,835,687
DATED : November 10, 1998
INVENTOR(S) : Jospeh Brown, et al It is certified that error appears in the above-identified patent and that said Letters Patent is hereby corrected as shown below:

Claim 22, col. 14, line 7, "P(i-1,i+1)" should read --P(i-1,j+1)--.

Claim 22, col. 14, line 8, "P(i+1j+1)" should read --P(i+1,j+1)--.

Claim 22, col. 14, line 11, "P(i-1,i+1)" should read --P(i-1,j+1),--.

Signed and Sealed this

Second Day of March, 1999

Attest:

Q. TODD DICKINSON

Attesting Officer

Acting Commissioner of Patents and Trademarks